H. M. O'BRIEN.
BELL TRAP.
APPLICATION FILED APR. 5, 1920.
1,411,125. Patented Mar. 28, 1922.
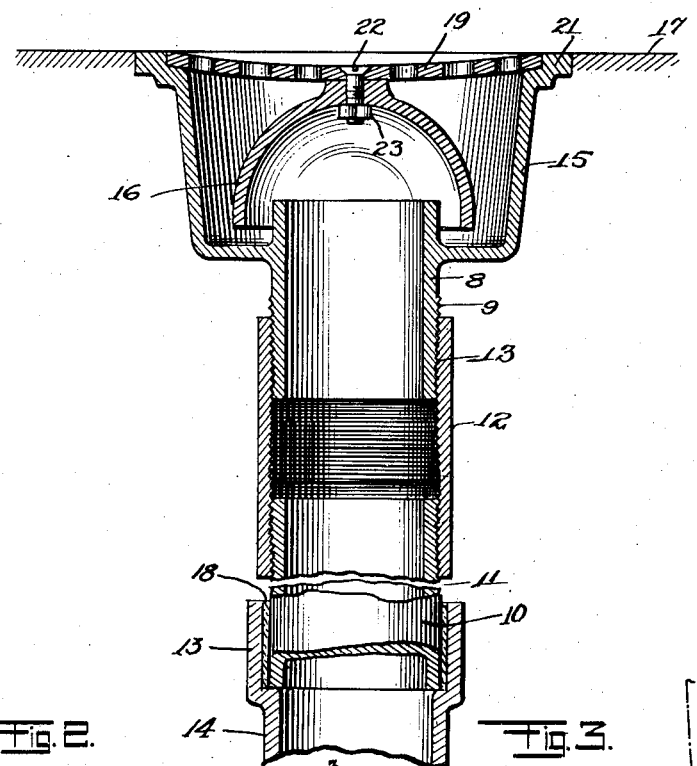
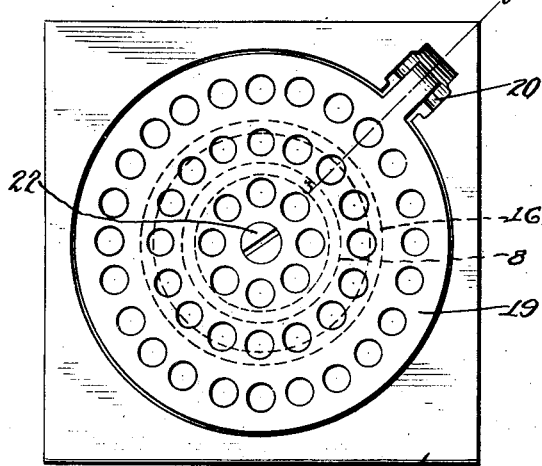
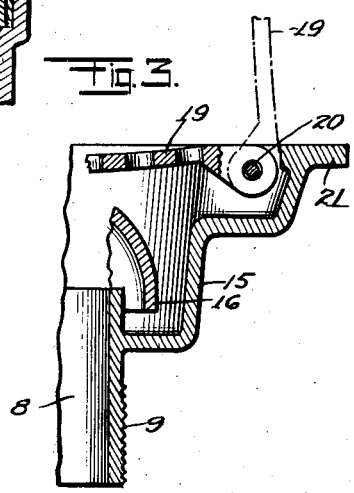
WITNESSES
M. E. Lessiw
INVENTOR
HUGH M. O'BRIEN
ATTORNEY

UNITED STATES PATENT OFFICE.

HUGH M. O'BRIEN, OF CORONA, NEW YORK.

BELL TRAP 1,411,125.

Specification of Letters Patent.　Patented Mar. 28, 1922.

Application filed April 5, 1920. Serial No. 371,528.

*To all whom it may concern:*

Be it known that I, HUGH M. O'BRIEN, a citizen of the United States, and a resident of Corona, in the county of Queens, borough of Queens, and State of New York, have invented certain new and useful Improvements in Bell Traps, of which the following is a full, clear, and exact description.

Among the principal objects which the present invention has in view are: to provide means for attaching a trap of the character mentioned without calking or packing the joint; to simplify the operation of installing the trap and to reduce the time necessary for the operation.

Drawings.

Figure 1 is a vertical section of a trap and a fragment of the waste pipe to which the same is connected;

Figure 2 is a top plan view of the same; and

Figure 3 is a vertical section on enlarged scale of a fragment of the trap showing in broken line the raised position of the cover.

Description.

Heretofore the approved practice for installing a bell trap on the service pipe has been to provide the service pipe with an upturned cupped end into which the delivery nipple of the trap is seated. The joint is then leaded or calked to make the same water tight. This operation is rendered peculiarly difficult by the fact that the trap is generally disposed in relation to the surrounding structure so that little or no room is afforded for the carrying into effect of the operation. Also the space below the trap is necessarily limited and inconvenient, which inclines the mechanic to hurry or neglect the operation.

The above mentioned difficulties are avoided when using parts for installing the trap constructed and arranged in accordance with the present invention. The nipple 8, which extends below the trap 15, inside the bell 16 thereof, is provided with a screw threaded section 9. The nipple 8 is short as compared with former constructions, and provided for the use of a short fitting pipe 10, having an end 11 threaded to receive the coupling 12. The threaded section 9 of the nipple 8 corresponds with the thread of the coupling 12. The coupling 12 is screwed tight on the pipe 10 to have a substantially fixed relation thereto.

The lower end of the pipe 10 is seated in the socket 13, formed on the end of the waste pipe 14. The joint between the pipe 10 and waste pipe 14 in the socket 13 is calked with the lead 18, which is poured into the joint while hot.

The bell trap 15 is of the usual construction having a cover 19, which is hinged by means of a pin 20 to the supporting flange 21 of the cup 15. An inverted bell 16 is secured by means of a screw 22 and nut 23 thereof, as shown best in Figure 1 of the drawings. When installing a bell trap constructed in accordance with the herein disclosed invention, the short fitting pipe 10 is measured and cut to measure with reference to the relation of the bell trap 15, when in its service position, and a waste pipe 14. The fitting pipe 10 is then attached to the waste pipe 14 by means of the calking 18. The pipe 10 having been previously equipped with the coupling 12, it is now possible to receive the threaded section 9, of the nipple 8, which is screwed down into the coupling 12, until the flange 21 rests in position to be flush with the floor 17 when the same is raised above the said flange.

It is obvious that as the operation of seating the pipe 10 in the socket 13 of the waste pipe 14 is not obstructed, a workmanlike operation may be performed. It is equally obvious that the bell trap 15 may be quickly and readily adjusted to its service position with reference to the floor 17, for which it may be raised or lowered on the threads of the coupling 12 and section 9.

It will also be understood that in the event of accident to the trap or parts connected therewith, it may be readily removed from service by unscrewing the nipple 8 from the coupling 12, an operation which may be quickly and easily performed.

Claim.

The combination of a bell trap having a depending integral externally threaded delivery nipple, a waste pipe alined with said nipple and having a hub or socket at its upper end, a short pipe section having its lower end rigidly and permanently calked in said socket and having the upper end thereof provided with an external screw thread, and an internally threaded pipe coupling sleeve having the nipple and the upper end of the short pipe section threaded into the ends thereof.

HUGH M. O'BRIEN.